United States Patent [19]

Frydel

[11] 4,418,593

[45] Dec. 6, 1983

[54] FORM TOOL HOLDER

[75] Inventor: Edmund W. Frydel, Marine City, Mich.

[73] Assignee: Fox Mfg. Co., Mt. Clemens, Mich.

[21] Appl. No.: 303,073

[22] Filed: Sep. 17, 1981

[51] Int. Cl.³ ............................................. B23B 29/00
[52] U.S. Cl. ..................................... 82/36 R; 407/86
[58] Field of Search ............ 82/36 R, 36 A, 37, 24 R, 82/24 A; 407/95, 96, 98, 86, 87

[56] References Cited

U.S. PATENT DOCUMENTS

| | | | |
|---|---|---|---|
| 1,015,903 | 1/1912 | Whitford et al. | 407/94 |
| 2,275,327 | 3/1942 | Sheridan et al. | 407/86 |
| 2,360,137 | 10/1944 | Jennings | 407/86 |
| 3,280,673 | 10/1966 | Holmes et al. | 82/36 R |
| 3,566,723 | 3/1971 | Oborne | 82/36 R |
| 3,572,196 | 3/1971 | Gourley | 82/36 R |
| 3,668,954 | 6/1972 | Brown | 82/36 R |
| 3,815,454 | 6/1974 | Knott | 82/36 R |

FOREIGN PATENT DOCUMENTS

| | | | |
|---|---|---|---|
| 837592 | 6/1960 | United Kingdom | 82/36 R |
| 1410918 | 10/1975 | United Kingdom | 82/36 R |
| 1430575 | 3/1976 | United Kingdom | 82/36 R |
| 380396 | 8/1973 | U.S.S.R. | 82/36 R |

*Primary Examiner*—Leonidas Vlachos
*Assistant Examiner*—Jerry Kearns
*Attorney, Agent, or Firm*—Harness, Dickey & Pierce

[57] ABSTRACT

A form tool holder having a dovetail slot for mounting a form tool cutter, a clamping rod for exerting concentrated clamping pressure laterally against the dovetail portion of the cutter adjacent one end of the slot, and a back-up block for exerting a holding force against the inner end of the cutter all in combination with a detachable tool base having a transverse key having provision for angular adjustment to align the cutting edge of the cutter precisely with respect to a workpiece, all of the actuators for the clamping rod, the back-up block, and the key being readily accessible for quick and easy actuation and adjustment of the parts referred to when the holder is mounted on a machine tool.

6 Claims, 9 Drawing Figures

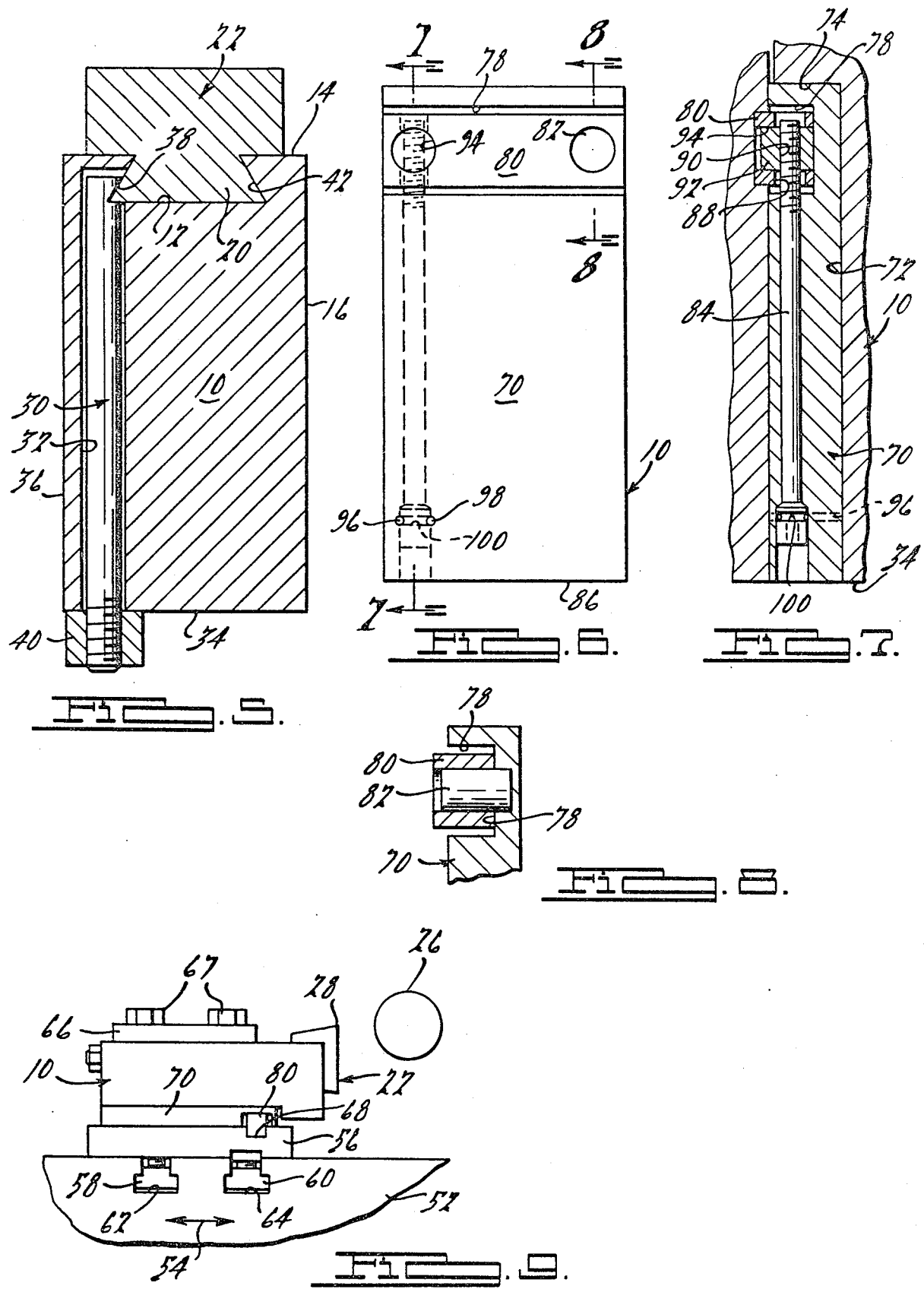

FORM TOOL HOLDER

STATEMENT OF THE INVENTION

This invention relates to new and useful improvements in form tool holders of the type adapted for mounting on the tool slide of a machine tool such as a lathe or the like.

BACKGROUND OF THE INVENTION

In practice, form tool cutters are conventionally provided with dovetail lower portions that fit into dovetail slots in suitable tool holders as shown, for example, in the U.S. Pat. No. 3,566,723 to Alfred C. Osborne dated Mar. 2, 1971. The dovetail slot usually extends entirely across the tool holder, and one side of the cutter dovetail is clampingly engaged by a plate that forms one side of the slot and is suitably detachably fastened to the holder as by screws or the like. When the screws are tightened, the dovetail portion of the cutting tool is clamped solidly between the clamping plate and the opposite side of the dovetail slot and, when the screws are loosened, the tool is released by the clamping plate for easy adjustment in the slot or for removal thereof for sharpening or replacement. In operation, the cutting tool is positioned in the dovetail slot with one end portion thereof projecting from the slot so that the cutting edge of the tool can be moved by the slide on which the tool holder is mounted into engagement with the work without interference from the holder.

Form tools are shaped in accordance with the configuration required by the particular job, and the cutter is sharpened by flat-grinding the working end of the cutter. As the cutter is ground away by successive sharpenings, it finally becomes so short that it can no longer be held adequately tightly by the clamping plate. When the cutting tool is new, it may extend substantially the full length of the dovetail slot so that the holding force exerted by the clamping plate is applied substantially uniformly against the entire length of the tool within the slot. However, as the cutting tool becomes progressively shorter in use, it finally reaches a point where the clamping plate no longer bears uniformly against the dovetail with the result that the tool shifts in the holder during a cutting operation. As a consequence, a defective part is produced which has to be scrapped. Alternatively, the cutter may simply break which of course ruins the cutter.

In a typical situation a new cutter may be 2½" long. By the time it has been ground away to half its length, it is so short that it cannot be properly held in the cutter using a conventional side clamping plate as hereinabove described. When this happens, the cutter usually is simply thrown away. This represents a waste since the cutters are made of expensive tungsten carbide or high speed steel.

BRIEF SUMMARY OF THE INVENTION

An important object of the present invention is to provide a novel form tool holder in which the cutting tool is mounted in a dovetail slot as heretofore but wherein the holder is provided with novel positioning, holding and clamping means that is uniquely constructed and arranged to hold the dovetail portion of the cutter adequately tightly for continued use long after it has been shortened by successive sharpening to the point where it would have begun producing defective parts or where it would have been necessary to discard it if it were being held in the dovetail slot by a clamping plate according to conventional practice.

Another object of the invention is to provide a tool holder having a base plate which is adapted to be detachably fastened in any suitable or conventional way to the slide of the machine and which is angularly adjustably interconnected with the tool holder body in such a way that the latter can be selectively adjusted angularly to position the cutting edge of the tool precisely parallel to the turning axis or the surface of the workpiece to be engaged thereby.

Still another object of the invention is to provide a tool holder of the above mentioned character in which the means for clamping and holding the tool in the dovetail slot of the holder and the means for adjusting the holder angularly with respect to the mounting plate of the machine are readily accessible for manual operation so that all necessary operations in mounting the cutting tool in the holder and all necessary or desirable adjustments and changes in the position of the cutting tool can be made easily and quickly even while the machine is in operation and without necessity of removing the tool holder from the machine.

DESCRIPTION OF THE PRIOR ART

The most relevant patent art presently known to the applicant and listed below was developed by a novelty search in the Patent and Trademark Office made prior to the preparation and filing of this patent application.

| Pat. No. | Inventor | Issue Date |
|---|---|---|
| 1,015,903 | Mills et al | 1/30/12 |
| 1,023,073 | Fritz | 4/9/12 |
| 1,057,257 | Miller | 3/25/13 |
| 1,203,799 | Slavik | 11/7/16 |
| 1,380,317 | Gustafson | 5/31/21 |
| 2,140,941 | Reaney | 12/20/38 |
| 2,155,337 | Speckert | 4/18/39 |
| 2,628,415 | Brown | 2/17/53 |
| 2,680,897 | Murphy | 6/15/54 |
| 3,102,441 | Milewski | 9/3/63 |
| 3,125,798 | Stein | 3/24/64 |
| 3,295,187 | Plummer | 1/3/67 |
| 3,566,723 | Osborne | 3/2/71 |
| 3,596,337 | Arnold et al | 8/3/71 |
| 3,694,879 | Kennicott | 10/3/72 |

The above patents together with the Osborne patent previously identified show various different constructions of form tool holders typical of the prior patent art, but they do not embody the construction of the form tool holder of the present invention nor do they teach or suggest how the advantages of the instant invention can be achieved.

DESCRIPTION OF THE DRAWINGS

FIG. 5 is a longitudinal sectional view taken on the line 5—5 of FIG. 1;

FIG. 6 is a plan view of the base plate that forms a part of the form tool holder of this invention, and it particularly illustrates the manner in which the positioning key bar carried by the base plate is mounted and actuated in use to adjust the cutting edge of the tool cutter angularly with respect to the work;

FIG. 7 is a longitudinal sectional view taken on the line 7—7 of FIG. 6;

FIG. 8 is a fragmentary, longitudinal sectional view taken on the line 8—8 of FIG. 6; and FIG. 9 is a side elevational view showing a typical mounting for the form tool holder of this invention in a lathe or the like.

DESCRIPTION OF THE PREFERRED EMBODIMENT

Figure 1:
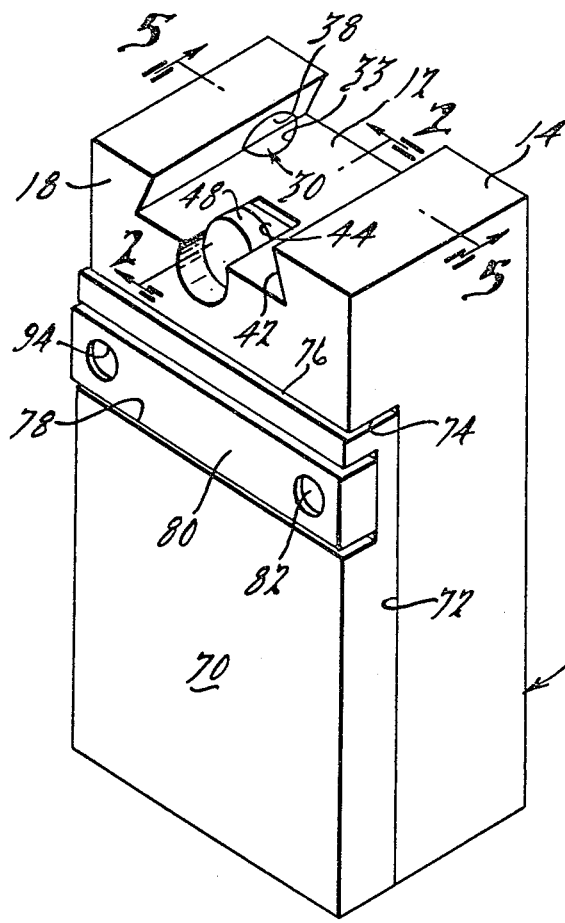
FIG. 1 is an isometric, perspective view showing a form tool holder base embodying the present invention.

In the drawings wherein for the purpose of illustration is shown a preferred embodiment of the invention, the numeral 10 designates the tool holder body which, as perhaps best illustrated in FIG. 1, is of elongate generally rectangular configuration. A dovetail slot 12 provided in one end 14 of the body 10 is disposed at substantially the middle of the end 14 and it extends entirely thereacross from the top or outer side 16 of the body to the bottom or under side 18 thereof. The dovetail portion 20 of a form tool cutter 22 is mounted in the dovetail slot 12, as shown in FIGS. 2, 4, 5 and 9. The dovetail portion 20 normally fits the dovetail slot 12 relatively snugly but sufficient clearance is provided so that the cutter is easily movable longitudinally in the slot. In normal use, one end portion of the tool cutter 22 projects from the dovetail slot 12, as shown in FIG. 9, so that the tool can be brought into engagement with a workpiece 26 without interference from the tool holder, and the projecting end 24 of the cutter is beveled to provide relief at the cutting edge 28. It will be readily appreciated that, while the tool cutter 22 is here shown as a generally rectangular block it may have any desired shape or configuration, according to conventional practice, so that the cutting edge 28 has the desired profile to produce the desired form or shape on the workpiece 22. As previously suggested, the cutter 22 is sharpened simply by flat grinding the end 24 to remove a narrow section or slice therefrom behind the cutting edge 28.

According to the present invention, the tool cutter 22 is held securely in the dovetail slot 12 by a tightener rod 30 (FIG. 5) which is mounted in a hole 32 drilled longitudinally in the body 10 from the rearward end 34 and adjacent the side 36 thereof and in intersecting relationship with one side of the dovetail slot 12. It will be observed, however, that the rod 30 preferably does not extend the full width of the dovetail side which it intersects but that it ends short of the end 14 of the body 10. Thus, both the hole 32 and the rod 30 terminate relatively close to the top 16 of the body 10. At the side thereof facing the dovetail slot 12, the tightener rod 30 is formed with a dovetail notch 38 the tapered side of which is disposed flush with or at least parallel to the adjacent side of the dovetail slot 12. The other end of the tightener rod 30 extends from the hole 32 beyond the end 34 of the body 10, and a nut 40 is threaded on the projecting portion of the rod. When the nut 40 is tightened against the body 10, it draws the dovetail notch 38 solidly against the dovetail portion 20 of the cutter 22 and in turn forces the dovetail portion solidly against the opposite side 42 of the dovetail slot 12.

In practice, the dovetail notch 38 concentrates lateral pressure against a relatively small surface area of the dovetail portion 20 adjacent the top 16 of the body 10 behind and in close proximity to the portion of the tool cutter 22 that projects from the dovetail slot 12. The fact that the notch 38 does not engage the entire side of the dovetail portion 20 as does the clamping plate identified by the numeral 3 in the Osborne patent herein above referred to, is critical and significant in providing a secure mounting and holding force for the cutter 22 when the latter becomes relatively short.

Figure 2:
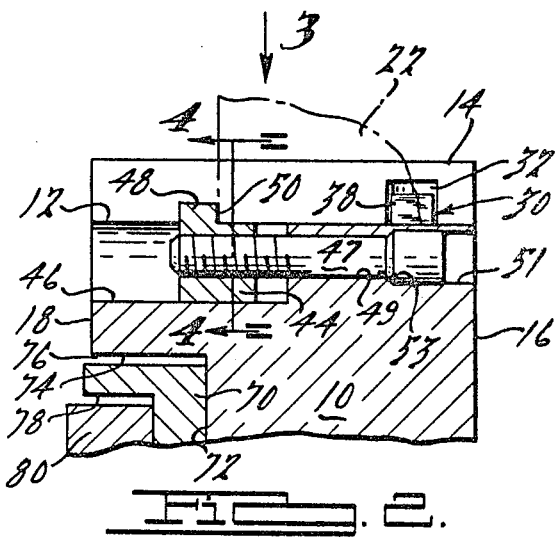
FIG. 2 is a fragmentary, longitudinal sectional view taken on the line 2—2 of FIG. 1.
Figure 3:
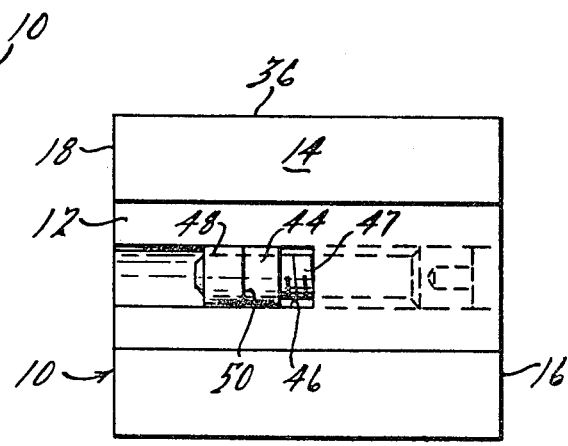
FIG. 3 is an end plan view looking in the direction of the arrow 3 in FIG. 2.
Figure 4:
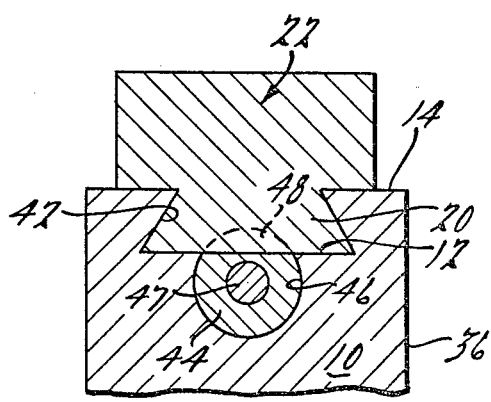
FIG. 4 is a fragmentary, transverse sectional view taken on the line 4—4 of FIG. 2.

The holding force exerted against the tool cutter 22 by the tightener rod 30 is particularly effective when the rod is used in combination with a back-up block 44 as shown in FIGS. 1-3. The back-up block 44 here shown fits snugly but slidably in a slot 46 provided in the bottom of the dovetail slot 12 substantially midway between the beveled sides of the latter, and an actuator screw 47 mounted for free rotation in a hole 49 drilled into the body 10 from the front 16 thereof is threaded into the block, as perhaps best shown in FIG. 2. The radially enlarged head of the screw 47 is received in a countersink 51 at the outer end of the hole 49, and the annular seat 53 thus provided at the bottom of the countersink defines a bearing surface against which the screw head acts when the screw is tightened to move the block 44 to the right as viewed in FIG. 2. The slot 46 extends from the bottom side 18 of the body 10, and in the drawing, it is shown as extending approximately half way along the length of the dovetail slot 12. In some instances it may be desirable to extend the slot 46 farther into the dovetail slot 12; but the distance the slot 46 extends into the slot 12 depends on the size of the slot itself and on the shape of the particular back-up block used. The slot 46 here shown is a blind hole drilled into the body 10 from the side 18 thereof so that it intersects the bottom of the dovetail slot 12. The back-up block 44 has a lateral extension 48 that projects above the bottom of the dovetail slot 12 so as to seat against the inner or rearward end of the tool cutter 22. The side 50 of the lateral extension 48 that seats on the tool 22 is flat and at right angles to the bottom surface of the dovetail slot 12 so that the extension engages and stabilizes the rear end of the tool 22. When the cutting tool 22 is clamped by the tightener rod 30 and seated solidly from behind by the back-up block 44, it is held tightly and in such a way that a much larger amount of the tool can be removed by successive sharpenings, or otherwise, without adversely affecting the ability of the tool holder to hold the tool cutter fixedly in the dovetail slot 12 notwithstanding the fact that both the tightening rod and the back-up block engage only relatively small surface areas of the tool.

As previously suggested, the form tool holder of this invention is adapted to be mounted on the slide of a machine with which the holder is adapted to be used. A fragmentary portion of a slide is shown at 52 in FIG. 9, and it will be understood that the slide is adapted to move back and forth to and from the workpiece 26, as indicated by the arrow 54. The slide 52 here shown is provided with a mounting block 56 which is attached to the slide by T-nut connectors 58 and 60 which operate in T-grooves 62 and 64 according to conventional practice. A clamping plate 66 fastened to the mounting block 56 by screws 67 is adapted to hold a form tool holder securely on the block during actuation of the slide and the cutting operation performed on the work 26 by the machine. A transverse key way 68 provided in the top of the mounting block 56 is adapted to accept a key in the tool holder to sustain rearward thrust resulting from the cutting operation.

In practice, the tool holder body 10 can be adapted for mounting directly on the block 56, but it preferably is provided with a separate tool base 70 on the bottom 18 thereof which faces the slide 52 since the tool base permits the tool holder to be adapted to whatever machine or kind of mounting is provided by the customer.

In the particular form of the invention here shown by way of illustration, the tool base 70 is in the form of a rectangular plate that fits in a recess 72 provided in the underside 18 of the tool holder body 10. As shown in FIG. 1, the recess 72 extends from the end 34 of the body 10 to a point short of the dovetail slot 12. The tool base 70 is the same width as the tool holder body 10, and it extends substantially the full length of the recess but terminates short of the inner end 74 thereof to provide a clearance 76 between the confronting ends of the tool base 70 and recess 72. Suitable means such as screws or the like (not shown) hold the tool base 70 securely but removably attached to the body 10 in the recess 72. It is desirable that the tool base 70 be removable so that different tool bases can be attached to the body 10 and substituted one for the other to adapt the tool holder for mounting on different machines.

The tool base 70 here shown by way of illustration is provided with a transverse slot or way 78 in the outer side and adjacent the inner end thereof, and a key bar 80 is mounted in the way. The key bar 80 here shown extends the full length of the way 78 and it is sufficiently narrower than the way so as to permit substantial movement of the bar transversely of the way. The key bar 80 is substantially thicker than the depth of the way 78 so that it extends above or beyond the outer face of the tool base 70 when it is bottomed in the way. One end of the key bar 80 is journaled on a pivot 82 that is set into and fixed to the tool base 70 at substantially the middle and adjacent one end of the way 78, as perhaps best shown in FIG. 8. Angular movement of the key bar 80 in the way 78 about the pivot 82 is accomplished by an adjusting screw 84 that extends longitudinally through the tool base 70 from the end 86 thereof. The threaded inner end of the adjusting screw 84 extends through a clearance hole 88 in the key bar 80 and into an internally threaded hole 90 in a cylindrical nut 92 that fits snugly but rotatably in an opening 94 provided in the end of the key bar 80 remote from the pivot 82. Transverse pins 96 and 98 fit in an annular groove 100 provided in the adjusting screw 84 and hold the latter against longitudinal movement. Thus, when the adjusting screw 84 is turned it moves the nut 92 longitudinally of the tool holder body 10 either upwardly or downwardly as viewed in FIG. 1 depending on the direction of rotation of the screw whereby to shift the key bar 80 on the pivot 82 and angularly in the way 78.

In use, the key bar 80 fits snugly in the way 68 provided in the mounting block 56. Consequently, angular adjustment of the key bar 80 in the way 78 permits the tool holder body 10 to be angularly adjusted on the slide 52 relative to the axis of the workpiece 26 so that the cutting edge 28 of the tool cutter 22 can be aligned precisely parallel to the axis of the work.

It is an important feature of this invention that the various parts of the tool holder are uniquely constructed and arranged so that the three adjustment actuators (the tightener rod 30 and the adjusting screws 47 and 84) are readily accessible for manual operation even when the holder is mounted on the machine. Note, for example, that the tightener rod 30 extends through the rearward end 34 of the body 10 so that the nut 40 is positioned where a wrench can be easily applied to it and manipulated to tighten or loosen the clamping pressure against the forward end portion of the tool cutter 22. Similarly, the head of the adjusting screw 84 is readily accessible through the outer terminal portion of the hole in which the screw is mounted since the hole opens through the rearward end of the tool base 70. The adjusting screw 47 is equally accessible through the countersink 51 which opens through the top of the body 10 adjacent one end of the latter where it is not obstructed by the clamping plate 66 or other means conventionally used for fastening tool holders to machine slides 52. As a consequence, all three of the adjustment operations possible with this tool holder can be made after the holder has been mounted on the machine, and even while the machine is in operation, with the result that machine set-up time is significantly reduced and final positioning of the cutting tool edge 28 is facilitated.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:
1. A form tool holder comprising
   a body having a dovetail slot in one end thereof for accepting and snugly but slidably fitting the dovetail portion of a conventional form tool cutter;
   mounting means on a side of the body at one end of said dovetail slot for detachably fastening said body to the tool support member of a machine tool; and
   means for holding the cutter securely in said dovetail slot comprising cooperative independently adjustable clamping and back-up means, said clamping means carried by said body at one side of said dovetail slot and being longitudinally movable transversely of the latter, said clamping means having a portion thereof in said dovetail slot complementing and engageable with the dovetail portion of said cutter at one side of said dovetail portion
   said back-up means comprising a way in and extending longitudinally of said dovetail slot and a back-up block mounted in and movable longitudinally along said way, said back-up block having a lateral abutment portion extending from said way into said dovetail slot through the bottom thereof for endwise engagement with the dovetail portion of said cutter to position the latter lengthwise in said slot when the cutter is released by said clamping means and being operative in use to position said cutter with one end portion thereof extending from said slot for proper engagement with a workpiece,
   said clamping means further including an actuator disposed at and operable from the end of said body opposite said dovetail slot, and
   said back-up means further including an actuator disposed at and operable from the side of said body opposite said mounting means for adjusting said back-up means in said way and longitudinally of said dovetail slot, said clamping means and said back-up means being mutually cooperative to hold the cutter in a selected longitudinally adjusted position in said dovetail slot.
2. The form tool holder as defined by claim 1, wherein said clamping means and said back-up means are disposed adjacent to opposite ends of said dovetail slot.
3. The form tool holder as defined by claim 1, wherein said clamping means is in the form of an elongate member carried by and longitudinally movable relative to said body and provided at one end thereof with a dovetail portion disposed in and complementing one side of said dovetail slot, wherein the actuator for said clamping means coacts with said elongate member to move the latter longitudinally of said body in one direction, whereby to tighten the dovetail portion of said member against the adjacent side of the cutter-dovetail-portion to force the latter solidly against the bottom and the opposite side of said dovetail slot, and wherein the actuator for said back-up means is unobstructively embedded in said body.

4. The form tool holder as defined by claim 1, wherein said clamping means is in the form of a rod disposed in and movable longitudinally of a hole provided in said body in intersecting relationship with said dovetail slot at one side of the latter, said rod having a dovetail portion disposed in and complementing the mentioned side of said dovetail slot, and wherein said clamping means actuator comprises a nut threaded on the end of said rod opposite said dovetail portion, said nut adapted to be tightened on said rod to force the dovetail portion thereof solidly against the cutter-dovetail-portion disposed in said slot to wedge the same against the bottom and opposite side of said dovetail slot, whereby said clamping means and said back-up means are mutually cooperable from entirely within said dovetail slot to hold said cutter securely on said body.

5. The form tool holder as defined by claim 1, wherein said mounting means comprises a crossbar or key carried by said body and adjustable angularly within predetermined limits about a mounting pivot disposed adjacent one end thereof, and actuator means coactive with said crossbar operable from the end of said body opposite said dovetail slot to adjust said crossbar angularly on said pivot to change the angular position of a cutter in said dovetail slot with respect to a workpiece engaged thereby.

6. A form tool holder as defined by claim 5, wherein said mounting means further includes a tool base detachably fastened to said body and provided at the outer side thereof with transverse grooves in which said crossbar is mounted, the depth of said groove being less than the thickness of said crossbar, whereby the latter projects beyond the mentioned side of said tool base, the projecting portion of said crossbar adapted to fit snugly in a groove conventionally provided in a tool slide on which said form tool is adapted to be mounted, whereby angular adjustment of said crossbar by its actuator means serves to adjust said form tool correspondingly.

* * * * *